United States Patent
Vogler et al.

(10) Patent No.: US 8,296,853 B2
(45) Date of Patent: Oct. 23, 2012

(54) METHOD AND SYSTEM FOR AUTHENTICATING A USER

(75) Inventors: Thomas Vogler, Darmstadt (DE); Dieter Kessler, Weiterstadt (DE); Heiko Weber, Darmstadt (DE); Johannes Viegener, Karlsruhe (DE)

(73) Assignee: Software AG, Darmstadt (DE)

( * ) Notice: Subject to any disclaimer, the term of this patent is extended or adjusted under 35 U.S.C. 154(b) by 1159 days.

(21) Appl. No.: 11/765,750

(22) Filed: Jun. 20, 2007

(65) Prior Publication Data

US 2008/0320602 A1 Dec. 25, 2008

(30) Foreign Application Priority Data

Jun. 14, 2007 (EP) .................................... 07011721

(51) Int. Cl.
*G06F 7/04* (2006.01)
(52) U.S. Cl. ................ 726/28; 726/2; 726/14; 707/736; 707/740; 709/219; 709/238
(58) Field of Classification Search .................... 726/28, 726/2, 14; 707/736, 740, 748; 709/219, 709/238

See application file for complete search history.

(56) References Cited

U.S. PATENT DOCUMENTS

2003/0188193 A1  10/2003  Venkataramappa

OTHER PUBLICATIONS

P. Mockapetris. "RFC 1034: Domain Names—Concepts and Facilities" © 1987 Network Working Group (56 pages) http://tools.ietf.org/pdf/rfc1034.pdf.*

T. Berners-Lee et al. "RFC 1738: Uniform Resource Locators (URL)" © 1994 Network Working Group (25 pages) http://tools.ietf.org/pdf/rfc1738.pdf.*

T. Howes et al. "RFC 2255: The LDAP URL Format" © 1997 Network Working Group (11 pages) http://tools.ietf.org/pdf/rfc2255.pdf.*

Wikipedia article for "URI scheme" Published Jun. 13, 2007 (8 pages) http://en.wikipedia.org/w/index.php?title=URI_scheme&oldid=138013113.*

T. Berners-Lee et al. "RFC 3986: Uniform Resource Identifier (URI) Generic Syntax" © 2005 Internet Society (61 pages) http://tools.ietf.org/pdf/rfc3986.pdf.*

K. Harrenstein et al. "RFC 954: Nicname/Whois" Published Oct. 1985 (4 pages) http://tools.ietf.org/pdf/rfc954.pdf.*

"James Server—Repositories" Publication date of Dec. 6, 2006 verified by the Internet Archive (1 page) http://web.archive.org/web/20061206002010/http://james.apache.org/server/2.3.0/repositories.html.*

"URISchemes From ESW Wiki" Published Feb. 14, 2007 (4 pages) http://esw.w3.org/index.php?title=UriSchemes&oldid=24267&printable=yes.*

J. Jaworski et al. "Java Security Handbook" Published Sep. 21, 2000. Excerpt from Chapter 14 (4 pages).*

(Continued)

*Primary Examiner* — Edward Zee
*Assistant Examiner* — Thomas Gyorfi
(74) *Attorney, Agent, or Firm* — Meyertons Hood Kivlin Kowert & Goetzel, P.C.; Jeffrey C. Hood

(57) ABSTRACT

Method of authenticating a user in a heterogeneous computer environment. The method may include defining a set of unique prefixes, each prefix identifying a type of user repository; defining a set of abstract repository names, each abstract repository name identifying an address of a user repository; and authenticating the user in the heterogeneous computer environment by assigning a sequence comprising a unique prefix, a reference to an abstract repository name and a unique identifier for the user within the user repository indicated by the reference to the abstract repository name.

16 Claims, 1 Drawing Sheet

OTHER PUBLICATIONS

"The TCP/IP Guide: DNS Name Server Load Balancing" Published Aug. 16, 2004 as verified by the Internet Archive (2 pages) http://classic-web.archive.org/web/20040816192547/http://www.tcpipguide.com/free/t_DNSNameServerLoadBalancing.htm.*

"Creating a DNS Alias Record" Revision 1.1 published Feb. 22, 2007 (1 page) http://support.microsoft.com/kb/168322.*

Microsoft Technet. "Managing resource records: Domain Name System (DNS)" Published Jan. 21, 2005 (4 pages) http://technet.microsoft.com/en-us/library/cc783389%28WS.10,printer%29.aspx.*

Brain, Marshall. "How Domain Name Servers Work" article published Dec. 15, 2005 as verified by the Internet Archive (7 pages) http://web.archive.org/web/20051215055529/www.howstuffworks.com/dns.htm/printable.*

European search report for application No. EP 07 01 1721, mailed Oct. 16, 2007.

Berners-Lee, et al., "Uniform Resource Locators (URL)", IETF Standard-Working-Draft, Internet Engineering Task Force, vol. uri, No. 7, Sep. 7, 1994, 18 pages.

Smith, et al., "The LDAP URL Format", IETF Standard-Working-Draft, Internet Engineering Task Force, CH, vol. ldapbis, Feb. 21, 2001, 14 pages.

Office Action of Sep. 8, 2008, in European Patent Application No. 07011721.3, 5 pages.

Mockapetris; P.; "Domain Names—Concepts and Facilities"; Network Working Group; Nov. 1987; 56 pages.

Armijo, et al.; "Discovering LDAP Services with DNS"; Internet Draft; University of Washington; Feb. 20, 2002; 7 pages.

* cited by examiner

LDAP:SouthEurope:cn=Adam,ou=users,o=spain,dc=company,dc=com 201  203  205

ADS:AME:JDoe 201  203  205

SAF:SERVER71:JFK 201  203  205

METHOD AND SYSTEM FOR AUTHENTICATING A USER

PRIORITY CLAIM

This application claims benefit of priority of European application no. EP 07 011 721.3 titled "Method And System For Authenticating A User", filed Jun. 14, 2007, and whose inventors are Thomas Vogler, Dieter Kessler, Heiko Weber, and Johannes Viegener.

TECHNICAL FIELD

The present invention relates to a method for authenticating a user in a heterogeneous computer environment.

BACKGROUND OF THE INVENTION

A computer system typically requires a user to authenticate himself to the system. Authentication is a necessary technical precondition for any authorization of a user. Only if a computer system or a network of connected computer systems can authenticate a user, i.e. be sure about his identity, the user can be authorized to perform certain actions within the network, such as adding, modifying or removing data.

Before the time of the Internet, the user's identity was only used within a limited space, typically a single computer. One user repository (for example, one LDAP directory) was sufficient for authentication of all users of the single computer system. However, with the development of computer networks, the use of only a single user repository is no longer sufficient. Accordingly, concepts were developed for authentication in a whole computer environment comprising several computer systems. One example is Microsoft's current Active Directory model, wherein multiple domains are combined within one "forest". In this concept, the indication of the domain name in front of the actual userid is sufficient for a unique identification.

However, most computer environments are nowadays no longer homogeneous but use instead hardware and software from a variety of vendors, which apply different authentication strategies. For example, a user may authenticate himself on a given Active Directory using MS programs as:
"euro\jdoe"

However, the same user, may authenticate himself on a UNIX system, which results in the following Id:
"cn=John Doe,ou=users,ou=England,dc=euro, dc=company, dc=com"

Another example is Windows NT: Internally, users are represented by a SID (security identifier), which is a numeric value that can globally identify a user uniquely within a windows domain. The form of the SID that can be read by humans and processed also by non-Windows software looks like:
jdoe@myorg.com.

In the Lightweight Directory Access Protocol (LDAP), the LDAP directory is a centrally reachable service that maintains, among other entries, user entries. Any LDAP object is always represented by its position within the hierarchical tree:
"cn=john doe, ou=userjo=eurjdc=mycomp,dc=org"

It is quite evident that there is no easy way to identify all of the above representations as actually referring to the same user. The above difficulties occur regardless of whether the user is a human or again a computer or an application, which accesses resources within the heterogeneous computer environment.

Such inconsistencies are particularly a problem, if tasks are delegated within a heterogeneous computer environment. To this end, credentials of a certain user are passed on in such a way that the recipient system must be able to recognize these credentials. Accordingly, it must be able to compare specific credentials with others and these credentials must be meaningful, and not just a blob of data. Only if the recipient understands the user credentials he can then take further authorization actions. Mapping one user id (of one part of the computer environment) to another resolves the issue only partly, since every mapping process leads to a loss of the information, namely, where a user may have authenticated himself for the first time in the overall computer environment.

Thus, in view of the above, improvements in authentication of users are desired.

SUMMARY OF THE INVENTION

Various embodiments for authenticating a user in a heterogeneous computer environment are provided below.

A method for authenticating a user in a heterogeneous computer environment may include:
a. defining a set of unique prefixes, each prefix identifying a type of user repository;
b. defining a set of abstract repository names, each abstract repository name identifying an address of a user repository; and
c. authenticating the user in the heterogeneous computer environment by assigning a sequence comprising a unique prefix, a reference to an abstract repository name and a unique identifier for the user within the user repository indicated by the reference to the abstract repository name.

Accordingly, a unique authentication or naming scheme may be provided, which allows to identify the type and the origin of the user repository, which authenticated the user in the heterogeneous computer environment, wherein different rules can be specified for each type of repository. Based on the provided unique scheme identities of human or non-human users can be compared to verify, whether a certain user is correctly authenticated and authorized to perform requested actions. It is no longer a problem, if, for example, the credentials of one specific user are gathered through different authentication processes, but using the same underlying repository, since all ambiguities can be resolved using the defined authentication scheme.

Further, information about users can be freely exchanged, since all participants of the heterogeneous computer environment "speak the same language" with respect to the description of a user, which is in addition easily readable for a human. The latter is important, since modern communication protocols, such as XML (SOAP), require the usage of a printable (human readable) form.

In one embodiment, the set of unique prefixes comprises prefixes for at least one user repository type of the group comprising:
 Lightweight Directory Access Protocol Server (LDAP)
 Windows Active Directory Server (ADS)
 Security Authorization Function (SAF), in particular RACF, ACF2 or TopSecret.

Alternatively or additionally, the set of unique prefixes may comprise a prefix of a user repository of any native operating system. Since the type of user repository may be identified by the prefix, embodiments described herein may be fully flexible to authenticate users, which are managed by a repository that is later added to an already existing computer environment and applies rules, which are unknown to the rest of the environment.

Step b. may include defining an Abstract Repository Name Catalogue, which maps references to abstract repository names and to physical addresses. This catalogue may define a mapping between references, abstract repository names and the various real addresses (for example an IP-address, depending on the unique prefix). More than one physical address can be provided for a single abstract repository name, if the respective repository can be accessed using more than one transport protocol such as TCP/IP, SSL, HTTP, HTTPS etc.

In one embodiment, there may be more than one reference for a single abstract repository name, if the respective repository requires different addressing information when accessed from different locations in the environment. The Abstract Repository Name Catalogue can be implemented as a database.

The methods described herein may be implemented or executing according to computer program(s) stored in memory medium(s) of computer system(s), e.g., in a heterogeneous computer environment.

BRIEF DESCRIPTION OF THE DRAWINGS

In the following detailed description, a presently preferred embodiment is described with reference to the drawings, with the following figures.

Figures 1, 2A, 2B, 2C:
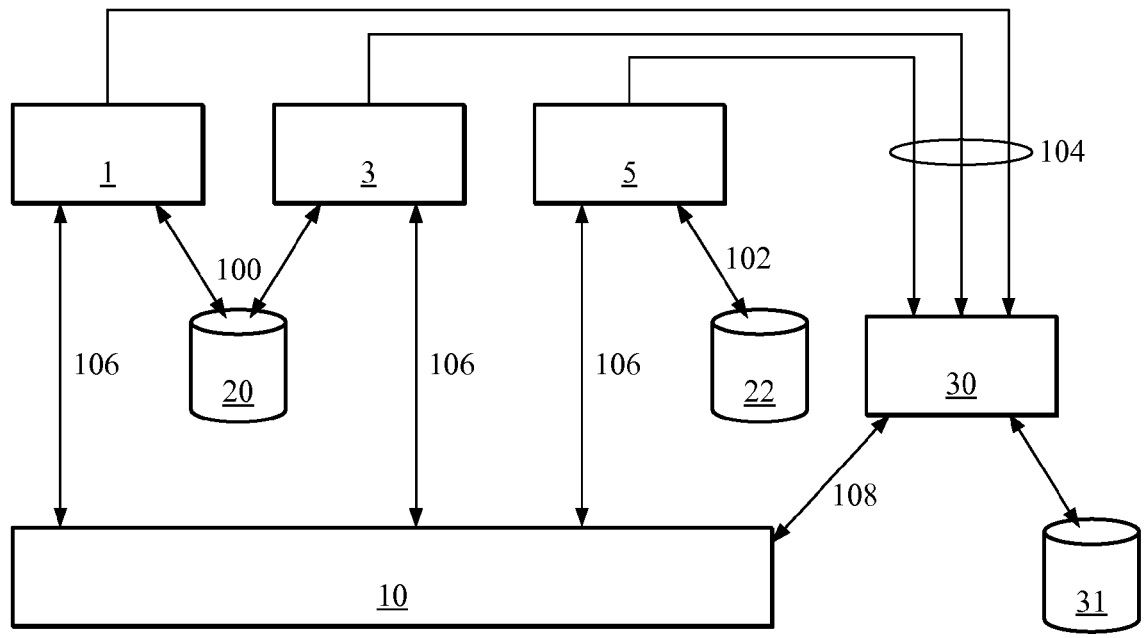
FIG. 1: A schematic representation of a heterogeneous computer environment in accordance with an embodiment.
FIG. 2a-c: Three examples of strings for authenticating a user in the heterogeneous computer environment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION

FIG. 1 presents a schematic representation of an exemplary computer environment comprising three clients 1, 3, 5 accessing an application 10. In some embodiments, the exemplary computer environment of FIG. 1 may be heterogeneous. For example, the clients 1, 3 and 5 and the application 10 may be running on different hardware platforms such as Windows servers, UNIX servers or mainframe systems (not shown in FIG. 1) or use the same hardware but different operating systems. However, in some embodiments, the computer environment may be a homogeneous environment.

A user in the system of FIG. 1 may be authenticated before here can perform any actions such as accessing the application 10. To this end, there may be one or more different user repositories provided in the environment. The example of FIG. 1 includes two repositories 20, 22. User repository 20 may authenticate in step 100 the clients 1 and 3; user repository 22 may authenticate in step 102 client 5. It is to be noted that the environment of FIG. 1 is substantially simplified. In a real computer environment (and in envisioned embodiments) there might be hundreds of widely distributed repositories authenticating large numbers of clients. Thus, embodiments are not limited to the exemplary computer environment shown in FIG. 1.

The repositories 20, 22 in the embodiment of FIG. 1 provide for each human or non-human user such as the clients 1, 3 and 5 a so-called User Principal Name (UPN). The UPN may specify in a prefix the type and in a further entry the actual user repository that was used to authenticate the credentials of a user. The authentication process can be performed in accordance with the specific rule of the respective repository 20, 22. Due to the flexibility provided by the invention, there may be no need for harmonizing the authentication rules of the various repositories 22, 22 of the heterogeneous environment. Further, new repositories can be added to the environment, as needed.

This may be made possible by including abstract reference names (ARN) in the UPN. Such an ARN may uniquely identify a user repository and the required address information that must be used to communicate with the repository 20, 22 identified by the repository name. If the ARNs of two entities are not identical, they still may point to the same physical repository.

The list of all active ARNs may be stored in an ARN catalogue 30, which may be accessible to all involved entities in the computer environment over the network. The ARN catalogue 30 can be implemented using a database 31. As can be seen in FIG. 1, both, the clients 1, 3 and 5 as well as the application 10 can accesses the ARN catalogue 30. Such an ARN catalogue 30 could be replicated in order to achieve high availability in the computer environment (not shown in FIG. 1).

As mentioned above, there can be multiple reference names for a certain user repository. To find out if two different reference names refer to the same or two different repositories, the repository names that are stored in the ARN Catalogue can be compared. Using references in the UPN has the advantage that the actual repository can be changed without invalidating the UPN. Therefore, the address of the repository can be changed without requiring an adaptation of all UPNs, which results in a simplified management of the UPNs. Finally, the addressing information for the repository may not be put directly into the UPNs; instead, a symbolic name may be used.

As schematically shown in FIG. 1, the ARN catalogue 30 may be in a set of first steps 104 contacted by the clients 1, 3 and 5 in order to retrieve the alias name available for the current session. I.e. what is the current principal repository that is used for the authentication? This alias name 203 (cf. FIG. 2 discussed below) will be used to compose the unique principal name.

Subsequently, the ARN catalogue 30 can in a step 108 be contacted by the application 10, which needs to understand the user credentials forwarded by the clients 1, 3 and 5, when requesting in step 106 a certain action from the application 10. More precisely, the clients 1, 3 and 5 may include their UPNs in their requests 106, which can then be verified by the application 10 contacting first the ARN catalogue 30 and then the respective user repository 20, 22, respectively.

The UPN may include, in addition to the prefix and the reference, a so-called principalIdentifier. The principalIdentifier uniquely specifies a human or non-human user within a certain user repository. The syntax notation for the principalIdentifier depends on the above mentioned prefix, which may indicate a certain type of user repository. The rules how such a principalIdentifier is encoded, may be made available for any entity of the environment for each of the possible user repository types.

FIGS. 2a-c present four examples of UPN strings for authenticating a user using different user repositories. The UPN string itself may be represented for portability issues always in UTF-8 encoded Unicode.

In the example of FIG. 2a, the prefix 201 may indicate a LDAP user repository. The following reference 203 indicates a user repository "SouthEurope". Using the ARN catalogue, any requesting entity can retrieve a physical address, where the referenced user repository can be found, for example a suitable IP address. The principalIdentifier 205, finally, may identify a certain user in the referenced repository in accordance with the rules off a LDAP repository.

In the example of FIG. 2b, the prefix 201 indicates a user repository of an Active Directory Server of Microsoft. The reference 203 "AME" indicates a certain user repository of the ADS type, whereas the remaining principalIdentifier 205 identifies a certain user "JDoe" in the specifically referenced ADS repository AME.

The third example, finally, presents a UPN in accordance with an embodiment of the invention for a user authenticated by a Security Authorization Function as it may be used for IBM mainframes. Accordingly, the prefix 201 indicates this type of repository. The following reference 203 may allow for finding the user specific SAF repository, where the user "JFK" has authenticated.

The sequence of the various elements of the UPN, as shown in the strings of FIGS. 2a-2 is only exemplary. The prefix, the reference and the principalIdentifier could be arranged in any order and be separated by any suitable delimiter.

It is apparent that FIGS. 2a-c present only a selection of a possibly unlimited number of UPNs which can be created for any arbitrary type of user repository. Implementing the principles of the present invention, a user authenticated with any accessible user repository can be uniquely identified, without having to prescribe a single or a limited number of identification mechanisms. By contrast, any known or new type of user repository can be used and corresponding UPNs can be generated.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A method for authenticating a user in a heterogeneous computer environment, the method comprising:
utilizing one or more computers to perform:
a. defining a set of unique prefixes, each prefix identifying a type of user repository;
b. defining a set of abstract repository names, each abstract repository name identifying an address of a user repository, wherein each abstract repository name is mapped to a user repository, and is used to retrieve required address information that must be used to communicate with the repository, wherein said defining comprises defining an Abstract Repository Name Catalogue, which maps references to abstract repository names and abstract repository names to physical addresses; and
c. identifying the user in the heterogeneous computer environment by assigning a sequence comprising a unique prefix, a reference to an abstract repository name and a unique identifier for the user within the user repository indicated by the reference to the abstract repository name, wherein the user repository is indicated via the mapping by the Abstract Repository Name Catalogue of the reference to the abstract repository name, and of the abstract repository name to the physical address of the user repository, wherein the unique identifier for the user uniquely identifies the user based on one or more rules of the user repository, and wherein authenticating the user comprises verifying that the identified user is authenticated for the indicated user repository based on the one or more rules;
wherein more than one physical address is provided for a single abstract repository name, if the respective repository can be accessed via more than one protocol, and wherein the Abstract Repository Name Catalogue selects the physical address to return to the requestor based on the protocol required by the requestor to access the repository.

2. The method of claim 1, wherein the set of unique prefixes comprises prefixes for at least one user repository type of one or more of:
Lightweight Directory Access Protocol Server (LDAP);
Windows Active Directory Server (ADS); or
Security Authorization Function (SAF), comprising RACF, ACF2 or TopSecret.

3. The method of claim 1, wherein the set of unique prefixes comprises a prefix of a user repository of a native operating system.

4. The method of claim 1, wherein there are more than one reference for a single abstract repository name.

5. The method of claim 1, wherein the Abstract Repository Name Catalogue is implemented as a database.

6. The method of claim 1, further comprising accessing the Abstract Repository Name Catalogue for verifying the authentication of the user by at least one application running in the heterogeneous computer environment.

7. The method of claim 1, wherein the abstract repository name in the sequence identifies a user repository, for authenticating the credentials of the user.

8. The method of claim 1, wherein the sequence is a string having the format of "prefix:reference:identifier".

9. A non-transitory memory medium comprising program instructions for authenticating a user in a heterogeneous computer environment, wherein the program instructions are executable by a processor to:
a. define a set of unique prefixes, each prefix identifying a type of user repository;
b. define a set of abstract repository names, each abstract repository name identifying an address of a user repository, wherein each abstract repository name is mapped to a user repository, and is used to retrieve required address information that must be used to communicate with the repository, wherein said defining comprises defining an Abstract Repository Name Catalogue, which maps references to abstract repository names and abstract repository names to physical addresses; and
c. identify the user in the heterogeneous computer environment by assigning a sequence comprising a unique prefix, a reference to an abstract repository name and a unique identifier for the user within the user repository indicated by the reference to the abstract repository name, wherein the user repository is indicated via the mapping by the Abstract Repository Name Catalogue of the reference to the abstract repository name, and of the abstract repository name to the physical address of the user repository, wherein the unique identifier for the user uniquely identifies the user based on one or more rules of the user repository, and wherein authenticating the user comprises verifying that the identified user is authenticated for the indicated user repository based on the one or more rules;

wherein more than one physical address is provided for a single abstract repository name, if the respective repository can be accessed via more than one protocol, and wherein the Abstract Repository Name Catalogue selects the physical address to return to the requestor based on the protocol required by the requestor to access the repository.

10. The non-transitory memory medium of claim 9, wherein the set of unique prefixes comprises prefixes for at least one user repository type of one or more of:

Lightweight Directory Access Protocol Server (LDAP);
Windows Active Directory Server (ADS); or
Security Authorization Function (SAF), comprising RACF, ACF2 or TopSecret.

11. The non-transitory memory medium of claim 9, wherein the set of unique prefixes comprises a prefix of a user repository of a native operating system.

12. The non-transitory memory medium of claim 9, wherein there are more than one reference for a single abstract repository name.

13. The non-transitory memory medium of claim 9, wherein the Abstract Repository Name Catalogue is implemented as a database.

14. The non-transitory memory medium of claim 9, wherein the program instructions are further executable to access the Abstract Repository Name Catalogue for verifying the authentication of the user by at least one application running in the heterogeneous computer environment.

15. The non-transitory memory medium of claim 9, wherein the abstract repository name in the sequence identifies a user repository, for authenticating the credentials of the user.

16. A computer system for authenticating a user in a heterogeneous computer environment, comprising:

a processor; and
a memory medium coupled to the processor, wherein the memory medium comprises program instructions executable by the processor to:
define a set of unique prefixes, each prefix identifying a type of user repository;
define a set of abstract repository names, each abstract repository name identifying an address of a user repository, wherein each abstract repository name is mapped to a user repository, and is used to retrieve required address information that must be used to communicate with the repository, wherein said defining comprises defining an Abstract Repository Name Catalogue, which maps references to abstract repository names and abstract repository names to physical addresses; and
identify the user in the heterogeneous computer environment by assigning a sequence comprising a unique prefix, a reference to an abstract repository name and a unique identifier for the user within the user repository indicated by the reference to the abstract repository name, wherein the user repository is indicated via the mapping by the Abstract Repository Name Catalogue of the reference to the abstract repository name, and of the abstract repository name to the physical address of the user repository, wherein the unique identifier for the user uniquely identifies the user based on one or more rules of the user repository, and wherein authenticating the user comprises verifying that the identified user is authenticated for the indicated user repository based on the one or more rules;

wherein more than one physical address is provided for a single abstract repository name, if the respective repository can be accessed via more than one protocol, and wherein the Abstract Repository Name Catalogue selects the physical address to return to the requestor based on the protocol required by the requestor to access the repository.

* * * * *